United States Patent
Setlak et al.

(10) Patent No.: US 9,867,134 B2
(45) Date of Patent: Jan. 9, 2018

(54) ELECTRONIC DEVICE GENERATING FINGER IMAGES AT A PROGRESSIVELY SLOWER CAPTURE RATE AND RELATED METHODS

(71) Applicant: Apple Inc., Cupertino, CA (US)

(72) Inventors: Dale Setlak, Melbourne, FL (US); Pavel Mrazek, Prague (CZ); Gordon S. Franza, Rockledge, FL (US); Patrick J. Landy, Melbourne, FL (US)

(73) Assignee: APPLE INC., Cupertino, CA (US)

( * ) Notice: Subject to any disclaimer, the term of this patent is extended or adjusted under 35 U.S.C. 154(b) by 38 days.

(21) Appl. No.: 15/014,382

(22) Filed: Feb. 3, 2016

(65) Prior Publication Data
US 2017/0091522 A1  Mar. 30, 2017

Related U.S. Application Data

(60) Provisional application No. 62/234,962, filed on Sep. 30, 2015.

(51) Int. Cl.
| | |
|---|---|
| G06K 9/00 | (2006.01) |
| H04W 52/02 | (2009.01) |
| G06T 7/00 | (2017.01) |
| G06K 9/03 | (2006.01) |

(52) U.S. Cl.
CPC .... *H04W 52/0274* (2013.01); *G06K 9/00013* (2013.01); *G06K 9/036* (2013.01); *G06T 7/0002* (2013.01); *Y02B 60/50* (2013.01)

(58) Field of Classification Search
CPC .......... G06K 9/00255; G06K 9/00067; G06K 9/00093; G06K 2209/00; G06F 21/32; G06T 7/0002; H04W 52/0274

USPC .................................................. 382/124, 313
See application file for complete search history.

(56) References Cited

U.S. PATENT DOCUMENTS

| | | | |
|---|---|---|---|
| 5,828,773 A | 10/1998 | Setlak et al. | |
| 6,990,218 B2 | 1/2006 | Wirtz | |
| 7,274,808 B2 * | 9/2007 | Baharav | G06F 3/0421 |
| | | | 382/124 |
| 7,693,314 B2 * | 4/2010 | Tykowski | G06F 1/32 |
| | | | 382/115 |
| 8,433,110 B2 | 4/2013 | Kropp et al. | |
| 8,616,451 B1 * | 12/2013 | Rao | G06K 9/0002 |
| | | | 235/375 |
| 8,718,404 B2 | 5/2014 | Chupeau et al. | |
| 9,251,329 B2 * | 2/2016 | Lien | G06F 21/32 |
| 2005/0190954 A1 | 9/2005 | Shatford | |
| 2008/0049987 A1 * | 2/2008 | Champagne | G06K 9/00026 |
| | | | 382/124 |
| 2008/0166028 A1 | 7/2008 | Turek et al. | |

(Continued)

*Primary Examiner* — Daniel Mariam
(74) *Attorney, Agent, or Firm* — Allen, Dyer, Doppelt + Gilchrist, P.A. Attorneys at Law (57) ABSTRACT

An electronic device may include finger biometric sensing pixels and a processor capable of cooperating with the finger biometric sensing pixels to generate a series of finger images at a progressively slower capture rate as a finger settling increases over time from initial placement of a user's finger adjacent the finger biometric sensing pixels. The processor may also be capable of cooperating with the finger biometric sensing pixels to determine a quality factor for each image in the series thereof, and select at least one image from the series thereof for matching and based upon the quality factor.

30 Claims, 5 Drawing Sheets

(56) References Cited

U.S. PATENT DOCUMENTS

| | | |
|---|---|---|
| 2008/0317278 A1 | 12/2008 | Lefebvre et al. |
| 2011/0285648 A1 | 11/2011 | Simon |
| 2014/0003677 A1 | 1/2014 | Han et al. |
| 2015/0193062 A1* | 7/2015 | Wyatt .................. G06F 3/0412 345/173 |
| 2016/0239704 A1* | 8/2016 | Yamada ............. G06K 9/00087 |
| 2017/0046554 A1* | 2/2017 | Subbarao ........... G06K 9/00013 |

* cited by examiner

PROCESSOR

- GENERATE (E.G., IN A MATCHING MODE) A SERIES OF FINGER IMAGES AT A PROGRESSIVELY SLOWER RATE AS A FINGER PRESSURE INCREASES OVER TIME FROM AN INITIAL STATIC PLACEMENT OF A USER'S FINGER ADJACENT THE PLURALITY OF FINGER BIOMETRIC SENSING PIXELS (E.G., BY AT LEAST CAPTURING THE SERIES OF FINGER IMAGES AS FINGER SETTLING INCREASES OVER TIME AT A CONSTANT RATE AND PROCESSING THE CAPTURED SERIES OF FINGER IMAGES AT THE PROGRESSIVELY SLOWER RATE)

- GENERATE (E.G., IN AN ENROLLMENT MODE) A SERIES OF FINGER IMAGES AT A CONSTANT RATE AS FINGER SETTLING INCREASES OVER TIME FROM AN INITIAL STATIC PLACEMENT OF A USER'S FINGER ADJACENT THE PLURALITY OF FINGER BIOMETRIC SENSING PIXELS, DETERMINE A QUALITY FACTOR FOR EACH IMAGE IN THE SERIES THEREOF, AND SELECT AT LEAST ONE IMAGE FROM THE SERIES THEREOF FOR ENROLLMENT BASED UPON THE QUALITY FACTOR (E.G., BY AT LEAST CAPTURING THE SERIES OF FINGER IMAGES AS FINGER SETTLING INCREASES OVER TIME AT A CONSTANT RATE AND PROCESSING THE CAPTURED SERIES OF FINGER IMAGES AT THE PROGRESSIVELY SLOWER RATE)

- AVERAGE PIXEL VALUES BASED UPON SERIES OF FINGER IMAGES

- DETERMINE A QUALITY FACTOR FOR EACH IMAGE IN THE SERIES THEREOF (E.G., BASED UPON DEFORMATION OF THE USER'S FINGER CONTRAST, A HISTOGRAM SHAPE, SMOOTHNESS, THRESHOLD AMOUNT OF ENERGY AT A GIVEN RIDGE FREQUENCY, IMAGE TRANSFORM, RIDGE-FLOW VECTOR MATRIX, VECTOR STRENGTH, ENTROPY, AND A REGION OF EACH IMAGE IN THE SERIES)

- SELECT AT LEAST ONE IMAGE FROM THE SERIES THEREOF FOR MATCHING AND BASED UPON THE QUALITY FACTOR

ELECTRONIC DEVICE GENERATING FINGER IMAGES AT A PROGRESSIVELY SLOWER CAPTURE RATE AND RELATED METHODS

TECHNICAL FIELD

The present invention relates to the field of electronics, and, more particularly, to the field of finger biometric sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device. In other words, in some instances it may be undesirable to have a user perform an authentication in a separate authentication step, for example switching between tasks to perform the authentication. It may also be desirable for a fingerprint sensor to perform other functions beyond authentication.

SUMMARY

An electronic device may include a plurality of finger biometric sensing pixels and a processor capable of cooperating with the plurality of finger biometric sensing pixels to generate a series of finger images at a progressively slower capture rate as a finger settling increases over time from initial placement of a user's finger adjacent the plurality of finger biometric sensing pixels. The processor may also be capable of cooperating with the plurality of finger biometric sensing pixels to determine a quality factor for each image in the series thereof, and select at least one image from the series thereof for matching and based upon the quality factor. Accordingly, finger images from a series thereof may be selected for matching based upon the quality factor, for example, the increased quality images for wet and dry fingers may be selected for matching.

The processor may cooperate with the plurality of finger biometric sensing pixels to generate the series of finger images at the progressively slower rate by at least capturing the series of finger images as finger settling increases over time at a constant rate, and processing the captured series of finger images at the progressively slower rate, for example. The processor may generate the series of finger images, determine the quality factor, and select the at least one image from the series thereof for matching in a matching mode. The processor may cooperate with the plurality of finger biometric sensing pixels in an enrollment mode to generate a series of finger images at a constant rate as finger settling increases over time from an initial static placement of a user's finger adjacent the plurality of finger biometric sensing pixels, determine a quality factor for each image in the series thereof, and select at least one image from the series thereof for enrollment based upon the quality factor.

The processor may include processing circuitry integrated with the plurality of finger biometric sensing pixels and a host processor coupled to the processing circuitry. The processing circuitry may be capable of generating a wakeup signal to switch the host processor from a low power sleep mode to an awake mode, for example. The processing circuitry may include at least one frame buffer capable of storing earliest ones of the series of finger images prior to the host processor switching to the awake mode.

The processor may be capable of determining the quality factor for each image based upon deformation of the user's finger. The processor may be capable of determining the quality factor for each image based upon at least one of contrast, a histogram shape, and smoothness, for example.

The processor may be capable of determining the quality factor for each image based upon at least one of a threshold amount of energy at a given ridge frequency and an image transform, for example. The processor may be capable of determining the quality factor for each image in the series thereof based upon at least one of a ridge-flow vector matrix, a vector strength, and an entropy.

The processor may be capable of determining the quality factor for each image based upon a region of each image in the series thereof. The processor may be capable of averaging pixel values based upon the series of finger images.

The plurality of finger biometric sensing pixels comprises electric field finger biometric sensing pixels, for example. The processor may be capable of selecting a plurality of images from the series thereof for matching and based upon the quality factor.

A method aspect is directed to a method of matching a finger biometric using an electronic device that includes a plurality of finger biometric sensing pixels and a processor capable of cooperating with the plurality of finger biometric sensing pixels. The method may include using the processor to generate a series of finger images at a progressively slower rate as a finger settling increases over time from an initial static placement of a user's finger adjacent the plurality of finger biometric sensing pixels and determine a quality factor for each image in the series thereof. The method may also include using the processor to select at least one image from the series thereof for matching and based upon the quality factor.

BRIEF DESCRIPTION OF THE DRAWINGS

FIG. 2b is a more detailed schematic diagram of the processor of FIG. 2a.

FIG. 3 is a flow chart of operation of the electronic device of FIG. 2a.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
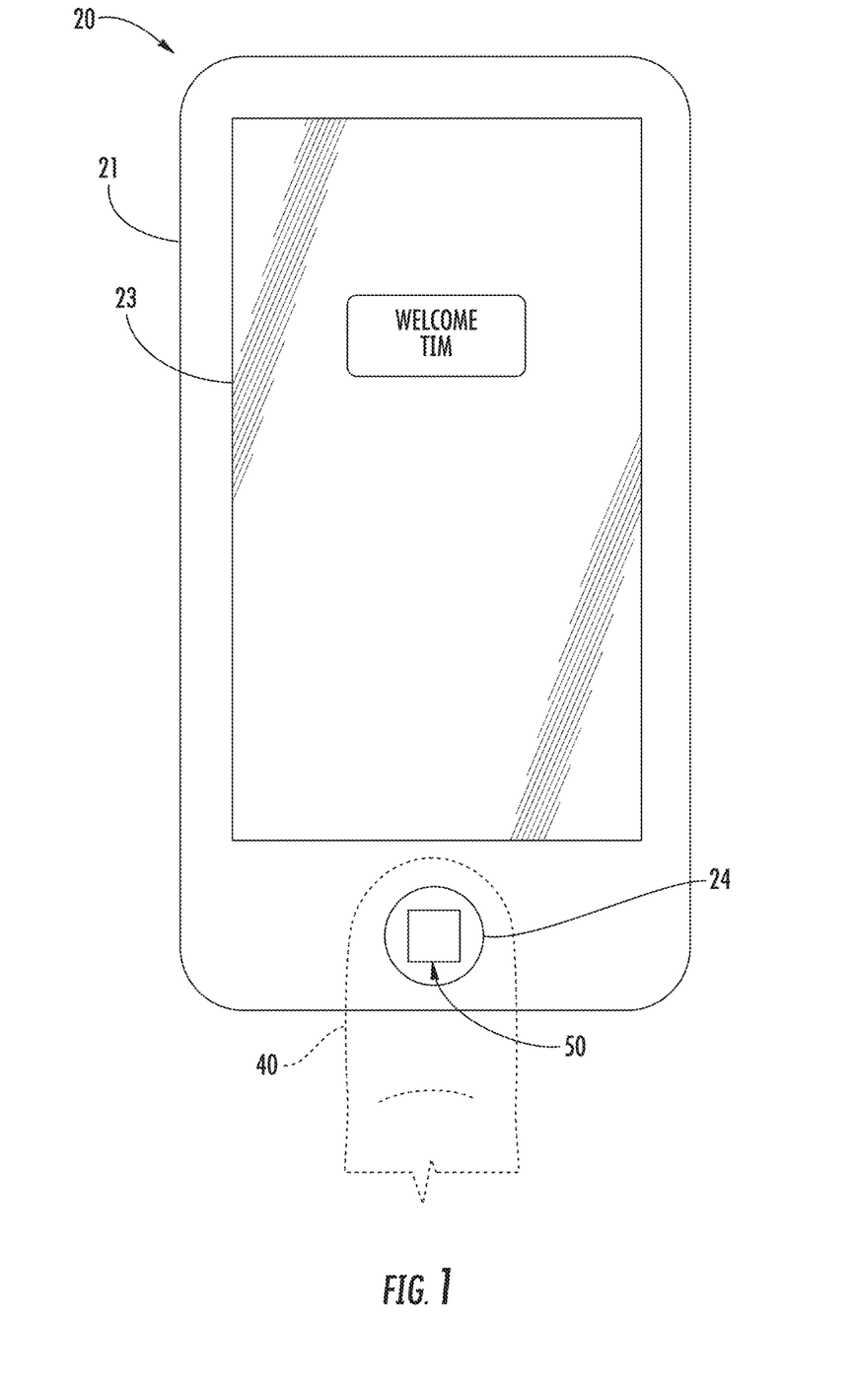
FIG. 1 is a plan view of an electronic device according to an embodiment.
Figure 2A:
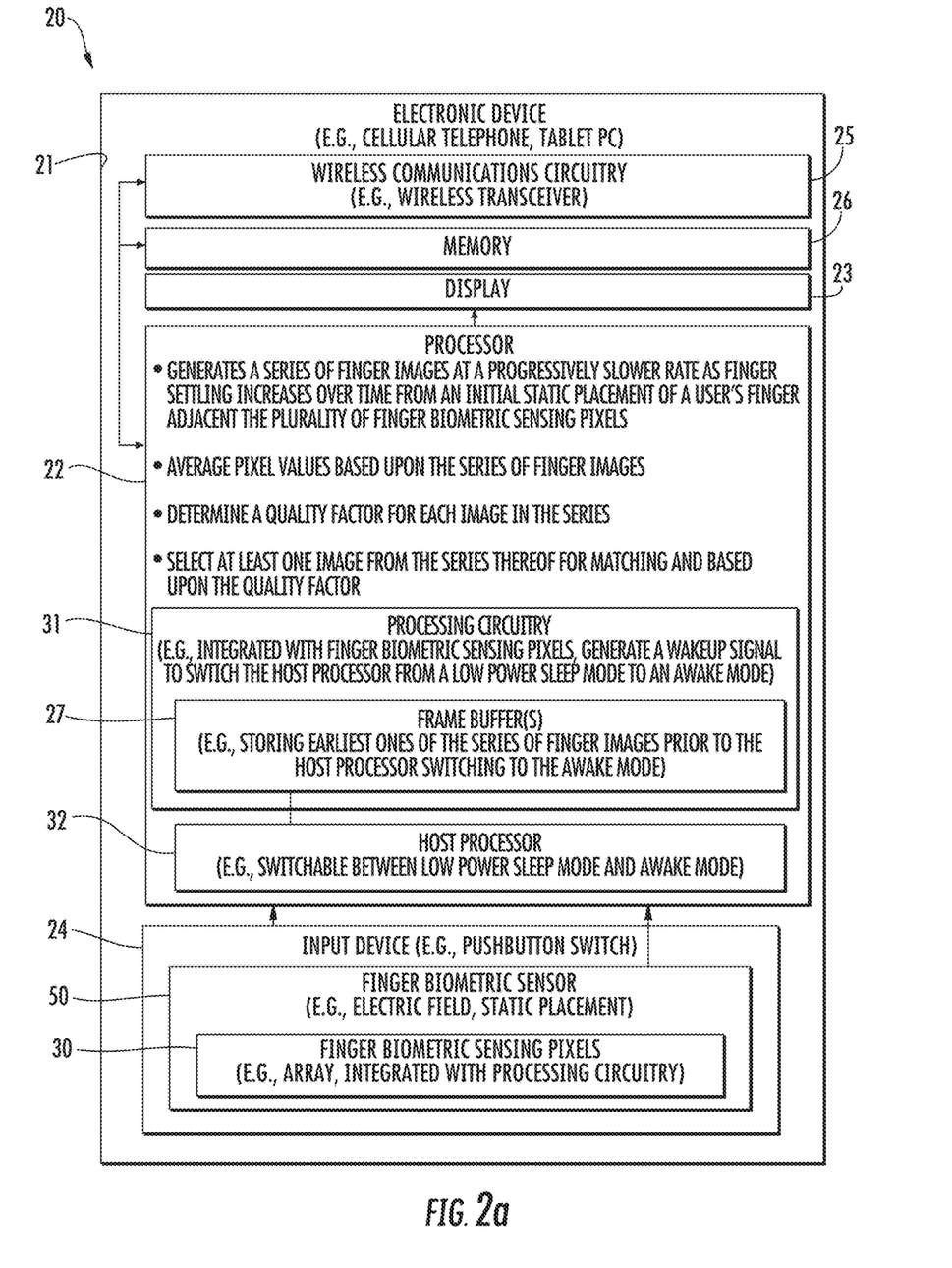
FIG. 2a is a schematic block diagram of the electronic device of FIG. 1.

Referring initially to FIGS. 1, 2a, and 2b, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc. In some embodiments, the electronic device 20 may be an integrated circuit for use with another or host electronic device.

Wireless communications circuitry 25 (e.g. a wireless transceiver, cellular, WLAN Bluetooth, etc.) is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25.

A display 23 is also carried by the portable housing 21 and is coupled to the processor 22. The display 23 may be a liquid crystal display (LCD), for example, or may be another type of display, as will be appreciated by those skilled in the art. A device memory 26 may be coupled to the processor 22.

A finger-operated user input device, illustratively in the form of a pushbutton switch 24, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

The electronic device 20 includes a finger biometric sensor 50 carried by the pushbutton switch 24. The finger biometric sensor 50 includes finger biometric sensing pixels 30, which may be electric field finger biometric sensing pixels, for example. The finger biometric sensing pixels 30 may be arranged in an array, as will be appreciated by those skilled in the art.

While a processor 22 has been described, the processor illustratively includes processing circuitry 31 integrated with the finger biometric sensing pixels 30 and a host processor 32 coupled to the processing circuitry. The processing circuitry 31 along with the finger biometric sensing pixels 30 may be carried by a substrate and in the form of an integrated circuit (IC), while the host processor 32 may be an upstream processor that may perform other and/or additional device functions, such as, for example, the wireless communications functions noted above. Some of the above-described functions may be performed by the host processor 32, for example, wireless communications functions. Other functions may be performed solely by the processing circuitry 31, and yet other functions may be performed by both the host processor and the processing circuitry.

Figure 3:
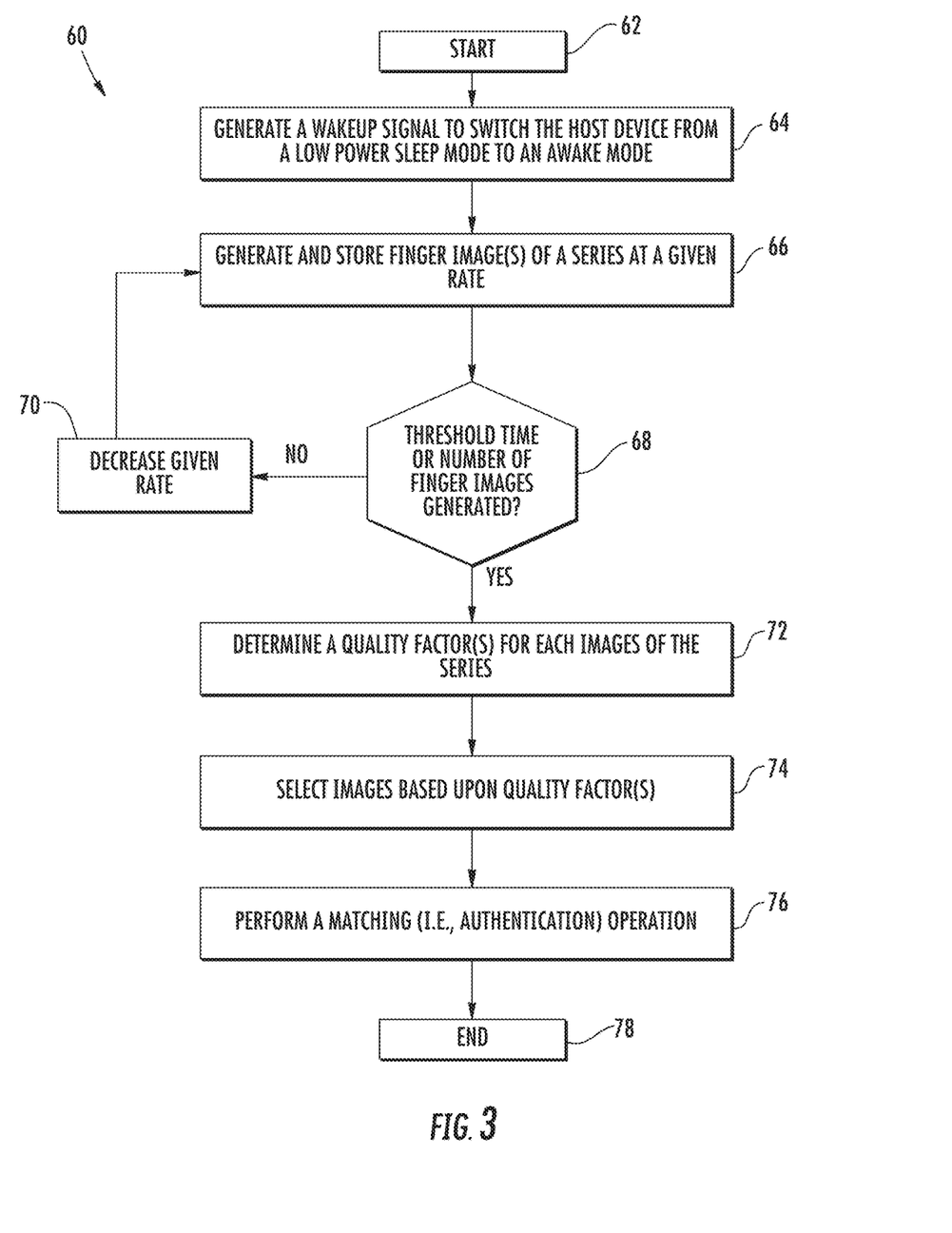

Referring now additionally to the flowchart 60 in FIG. 3, further details of the operation of the processor 22 will now be described. Beginning at Block 62, the processing circuitry 31 generates a wakeup signal to switch the host processor 32 from a low power sleep mode to an awake mode (Block 64). The wakeup signal may be generated by the user's finger coming in contact with a finger sensing area adjacent the finger biometric sensing pixels 30 or by coming in relatively close proximity to the finger biometric sensing pixels. Of course, the processing circuitry 31 may generate the wakeup signal based upon other and/or additional conditions. In some embodiments, a wakeup signal may not be generated.

The processor 22 cooperates with the finger biometric sensing pixels 30 to generate a series of finger images. The earliest images of the series of finger images may be generated upon generation of the wakeup signal (i.e., concurrently), after generation of the wakeup signal, or before generation of the wakeup signal. The processing circuitry 32 may include a frame buffer 27 that stores earliest ones of the series of finger images prior to the host processor switching to the awake mode.

The frame buffer 27 may be part of the overall device memory 26, for example, and other data may be stored in the frame buffer. As will be appreciated by those skilled in the art, there may be some delay between the generation of the wakeup signal and host device switching between the low power sleep mode to the awake mode. During this time period, generated images may be stored. This may be particularly important if the host processor 31 performs operations based upon the generated images, for example.

To more efficiently process the generated series of finger images, for example, within an acceptable time period, the processor 22 may employ wide range adjustable pixel averaging to get the initial frames relatively fast at relatively low averaging, and thereafter apply a relatively large amount of averaging to get a very low noise floor for the slow frames. This may be particularly advantageous for capturing very dry fingers, for example.

The processor 22 generates images of the series of finger images at a progressively slower rate as finger settling increases over time from an initial static placement of a user's finger 40 adjacent the plurality of finger biometric sensing pixels (Blocks 66, 68, and 70). In other words, as the user's finger 40 or skin thereof settles adjacent the finger biometric sensor 50 or finger biometric sensing pixels 31, the rate at which the finger images are generated decreases (Block 70). Thus, for the series of generated finger images, a first group of generated finger images may be considered fast frames, while a next group in the series may be considered normal frames, while a last group in the series of generated finger images may be considered slow frames. Exemplary frame or image generation rates may be between 12-60 frames per second, but other frame rates may also be used.

It will be appreciated by those skilled in the art that not every image of the series or every frame be generated at a slower rate. For example, there may be groups of finger images that are generated at a same rate within the group, and each group in the series may be progressively generated at the slower rate. In one exemplary embodiment, the processor 22 may cooperate with the finger biometric sensing pixels 30 to generate the series of finger images at the progressively slower rate by capturing the series of finger images as finger settling increases over time at a constant rate and processing the captured series of finger images at the progressively slower rate. For example, the processing circuitry 31 may capture the finger images at the constant rate, while the host processor 32 may process the captured images at the progressively slower rate. Alternatively, for example, the processing circuitry 31 may capture the finger images at the progressively slower rate, while the host processor 32 may process the captured images at a constant rate.

In some embodiments, the processor 22 may generate the series of finger images, determine the quality factor, and select the image or images from the series thereof for matching in a matching mode. As will be appreciated by those skilled in the art, in the matching mode, one or more of the selected images are matched against one or more finger images from an enrollment process that are stored in the memory 26, for authentication purposes. The processor 22 may also cooperates with the finger biometric sensing pixels 30 in an enrollment mode to generate a series of finger images at a constant rate as finger settling increases over time from an initial static placement of a user's finger 40 adjacent the finger biometric sensing pixels 30, determine a quality factor for each image in the series thereof, and select at least one image from the series thereof for enrollment based upon the quality factor. The selected images are stored in the memory 26 for matching.

The processor 22 may generate the images as video, for example. In other words, the processor 22 may generate the series of images in accordance with a video standard, for example, similar to the Motion Picture Expert Group (MPEG) encoding standard. More particularly, the series of images may be stored to include a key frame and pixel difference, as will be appreciated by those skilled in the art. The processor 22 generates the series of finger images (Block 66) at the slower rate (Block 70) until a threshold time period or until a threshold number of finger images has been generated (Block 68). Other factors may be used to determine when to stop generated finger images of the series thereof.

The processor 22 also determines a quality factor for each image in the series thereof (Block 72). This may be performed concurrently with the generation of series of finger images or after generation. The quality factor may be based upon a deformation of the user's finger. For example, ridges of the user's finger 40 may deform differently during different temperatures. The quality factor may be determined based upon one or more regions of each image in the series, and may not be based upon the entire image. This may increase processing speed, for example. Moreover, more than one quality factor may be determined for each image in the series.

Some exemplary quality factors that may be determined based upon regions of the images or image frames may include in the image domain, for example, local contrast, gray scale histogram shape, and smoothness (i.e., lack of abrupt artifacts). Other exemplary quality factors may include, in the spatial frequency domain, for example, a presence of significant energy at a reasonable ridge frequency. Similar quality factors may be determined using wavelet transforms and other transforms, as will be appreciated by those skilled in the art. A quality factor may also be determined by performing fusion in the frequency domain and then performing an inverse of the transform back to the image domain.

In the feature domain (or texture domain), the quality factor may be based upon a ridge-flow vector matrix for each image can be calculated, and then metrics, such as, for example, local vector strength, smoothness, and entropy may be applied. Fusion can also be done at the feature or ridge-flow level by combining relatively strong feature information from several images or frames (feature level fusion) into a final feature map for matching, for example.

Still further, other quality factors may include, in the frequency domain, an optimization of the frequency spectrum of useful (ridge) vs. harmful frequencies (noise, discontinuities), finger motion between frames, for example, the stability of the image or feature information between frames where stable information may be used and/or combined and outliers removed. Other external information may also be used as a basis for a quality factor, such as, for example, finger pressure adjacent the finger biometric sensing pixels 30. The quality factor may be based upon other and/or additional factors, information, and/or calculations, as will be appreciated by those skilled in the art. Moreover, several techniques for determining the quality factor may be combined or used in conjunction with one other to determine the quality factor for a given image or frame.

The processor 22, at Block 74, selects an image from the series thereof for matching and based upon the quality factor. The processor 22 may select the image from the series thereof for matching based upon more than quality factor, either alone or in combination.

More particularly, based upon quality factor or factors in combination, the processor 22 may select the single image or image frame that has the largest total area of good quality for matching. Alternatively, regions that have what may be considered the best quality from several different images or image frames may be selected and either combined into a single image for matching (image/feature fusion), or the selected regions may be individually matched (e.g., as nodes in our composite template matching system) and the scores for a final result combined (i.e., score level fusion). Alternatively, or additionally, several full frames or images may be combined (e.g. frame averaging, image/feature fusion at the frame level).

The selected image may be matched against an enrolled image, for example, stored in the memory 26 (Block 76) before ending at Block 78. As will be appreciated by those skilled in the art, the matching may be used for authentication or for performing other device functions. Additional operations may be performed by the processor 22, for example, spoof detection, enrollment, etc., as will be appreciated by those skilled in the art.

While the functions with respect to image generation and determining a quality factor have been described as being performed by the processor 22, or more particularly, one of the host processor 31 and the processing circuitry 32, it will be appreciated by those skilled in the art that these functions may be performed by either or both of the host processor and processing circuitry.

Figure 4:
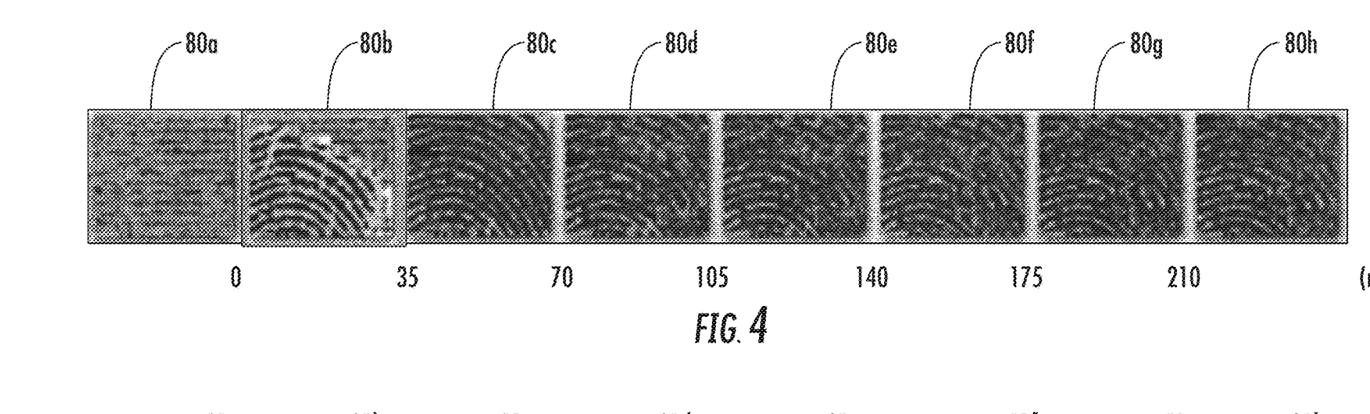
FIG. 4 is a series of sweaty finger images generated using a test platform according to an embodiment.
Figure 5:
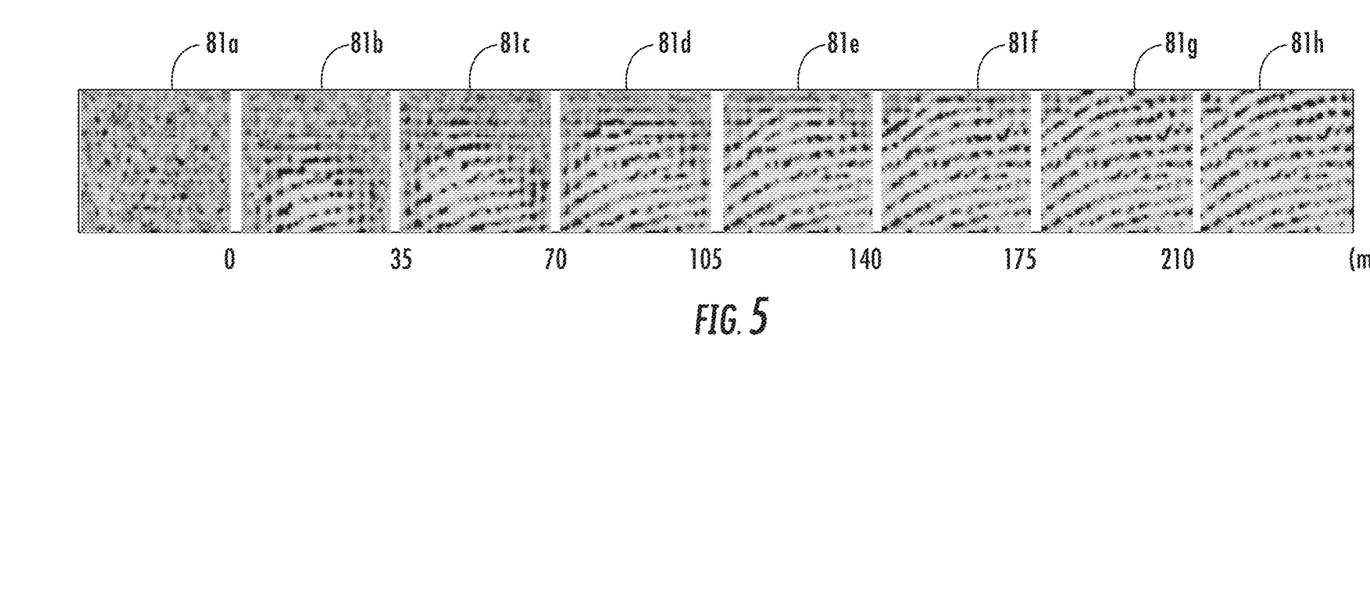
FIG. 5 is a series of dry finger images generated using a test platform according to an embodiment.

Referring now to FIGS. 4 and 5, the electronic device 20 described herein may be particularly advantageous for matching different finger types, for example, sweaty versus dry fingers. As will be appreciated by those skilled in the art, different climates may correspond to whether a finger is sweaty or dry. A dry finger may deform differently from a sweaty or wet finger as a finger settles. This deformation may serve as a basis for determining one or more of the quality factors. In particular, different finger types generate the best images after different amounts of delay. The best sweaty finger images typically are generated relatively quickly after initial finger contact, while the best dry finger images are generated much later after initial contact. More particularly, the signal-to-noise ratio (SNR) of raw image data of wet images early in settling and dry images late in settling is greatly improved such that the SNR of the raw image data is improved by the sequencing. A series of images $80a$-$80h$ generated using a test platform are illustrated in FIG. 4 and correspond to a relatively very sweaty finger. Another series of images $81a$-$81h$ generated using the test platform are illustrated in FIG. 5 and correspond to a relatively very dry finger. Illustratively, what may be considered the best images, $80b$, $81h$, occur relatively early for sweaty finger and much later for dry fingers.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data that benefit the user, are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a plurality of finger biometric sensing pixels; and
a processor arranged to cooperate with the plurality of finger biometric sensing pixels to
generate a series of finger images at a progressively slower rate as finger settling increases over time during static placement of a user's finger adjacent the plurality of finger biometric sensing pixels,
determine a quality factor for each image in the series thereof, and
select at least one image from the series thereof for matching for authentication and based upon the quality factor.

2. The electronic device of claim 1 wherein the processor cooperates with the plurality of finger biometric sensing pixels to generate the series of finger images at the progressively slower rate by at least
capturing the series of finger images as finger settling increases over time at a constant rate; and
processing the captured series of finger images at the progressively slower rate.

3. The electronic device of claim 1 wherein the processor generates the series of finger images, determines the quality factor, and selects the at least one image from the series thereof for matching in a matching mode; and wherein the processor cooperates with the plurality of finger biometric sensing pixels in an enrollment mode to
generate a series of finger images at a constant rate as finger settling increases over time from an initial static placement of a user's finger adjacent the plurality of finger biometric sensing pixels;
determine a quality factor for each image in the series thereof; and
select at least one image from the series thereof for enrollment based upon the quality factor.

4. The electronic device of claim 1 wherein the processor comprises:
processing circuitry integrated with the plurality of finger biometric sensing pixels; and
a host processor coupled to the processing circuitry.

5. The electronic device of claim 4 wherein the processing circuitry is arranged to generate a wakeup signal to switch the host processor from a low power sleep mode to an awake mode.

6. The electronic device of claim 5 wherein the processing circuitry comprises at least one frame buffer arranged to store earliest ones of the series of finger images prior to the host processor switching to the awake mode.

7. The electronic device of claim 1 wherein the processor is arranged to determine the quality factor for each image based upon deformation of the user's finger.

8. The electronic device of claim 1 wherein the processor is arranged to determine the quality factor for each image based upon at least one of contrast, a histogram shape, and smoothness.

9. The electronic device of claim 1 wherein the processor is arranged to determine the quality factor for each image based upon at least one of a threshold amount of energy at a given ridge frequency and an image transform.

10. The electronic device of claim 1 wherein the processor is arranged to determine the quality factor for each image in the series thereof based upon at least one of a ridge-flow vector matrix, a vector strength, and an entropy.

11. The electronic device of claim 1 wherein the processor is arranged to determine the quality factor for each image based upon a region of each image in the series thereof.

12. The electronic device of claim 1 wherein the processor is arranged to average pixel values based upon the series of finger images.

13. The electronic device of claim 1 wherein the plurality of finger biometric sensing pixels comprises electric field finger biometric sensing pixels.

14. The electronic device of claim 1 wherein the processor is arranged to select a plurality of images from the series thereof for matching and based upon the quality factor.

15. An electronic device comprising:
a housing;
a finger operated user input device carried by the housing;
a plurality of finger biometric sensing pixels carried by the finger operated user input device; and
a processor carried by the housing and arranged to cooperate with the plurality of finger biometric sensing pixels to
generate a series of finger images at a progressively slower rate as a finger settling increases over time during static placement of a user's finger adjacent the plurality of finger biometric sensing pixels,
determine a quality factor for each image in the series thereof, and
select at least one image from the series thereof for matching for authentication and based upon the quality factor.

16. The electronic device of claim 15 wherein the processor cooperates with the plurality of finger biometric sensing pixels to generate the series of finger images at the progressively slower rate by at least
capturing the series of finger images as finger settling increases over time at a constant rate; and
processing the captured series of finger images at the progressively slower rate.

17. The electronic device of claim 15 wherein the processor generates the series of finger images, determines the quality factor, and selects the at least one image from the series thereof for matching in a matching mode; and wherein the processor cooperates with the plurality of finger biometric sensing pixels in an enrollment mode to
generate a series of finger images at a constant rate as finger settling increases over time from an initial static placement of a user's finger adjacent the plurality of finger biometric sensing pixels;
determine a quality factor for each image in the series thereof; and
select at least one image from the series thereof for enrollment based upon the quality factor.

18. The electronic device of claim 15 wherein the processor comprises:
processing circuitry integrated with the plurality of finger biometric sensing pixels; and
a host processor coupled to the processing circuitry.

19. The electronic device of claim 18 wherein the processing circuitry is arranged to generate a wakeup signal to switch the host processor from a low power sleep mode to an awake mode.

20. The electronic device of claim 19 wherein the processing circuitry comprises at least one frame buffer arranged to store earliest ones of the series of finger images prior to the host processor switching to the awake mode.

21. The electronic device of claim 15 wherein the finger operated input device comprises a pushbutton switch.

22. The electronic device of claim 15 further comprising wireless communications circuitry carried by the housing; and wherein the processor is arranged to cooperate with the wireless communications circuitry to perform at least one wireless communications function.

23. A method of matching a finger biometric using an electronic device that includes a plurality of finger biometric sensing pixels and a processor capable of cooperating with the plurality of finger biometric sensing pixels, the method comprising:
using the processor to
generate a series of finger images at a progressively slower rate as a finger settling increases over time during static placement of a user's finger adjacent the plurality of finger biometric sensing pixels,
determine a quality factor for each image in the series thereof, and
select at least one image from the series thereof for matching for authentication and based upon the quality factor.

24. The method of claim 23 wherein the processor is used to generate the series of finger images at the progressively slower rate by at least
capturing the series of finger images as finger settling increases over time at a constant rate; and
processing the captured series of finger images at the progressively slower rate.

25. The method of claim 23 wherein the processor is used to generate the series of finger images, determine the quality factor, and select the at least one image from the series thereof for matching in a matching mode; and wherein the processor is used in an enrollment mode to
generate a series of finger images at a constant rate as finger settling increases over time from an initial static placement of a user's finger adjacent the plurality of finger biometric sensing pixels;
determine a quality factor for each image in the series thereof; and
select at least one image from the series thereof for enrollment based upon the quality factor.

26. The method of claim 23 wherein the processor comprises processing circuitry integrated with the plurality of finger biometric sensing pixels and a host processor coupled to the processing circuitry; and wherein the processing circuitry generates a wakeup signal to switch the host processor from a low power sleep mode to an awake mode.

27. The method of claim 23 wherein the processor determines the quality factor for each image based upon deformation of the user's finger.

28. The method of claim 23 wherein the processor determines the quality factor for each image based upon at least one of contrast, a histogram shape, and smoothness.

29. The method of claim 23 wherein the processor determines the quality factor for each image based upon at least one of a threshold amount of energy at a given ridge frequency and an image transform.

30. The method of claim 23 wherein the processor determines the quality factor for each image in the series thereof based upon at least one of a ridge-flow vector matrix, a vector strength, and an entropy.

* * * * *